June 2, 1925.

W. H. SCOTT ET AL 1,540,655

ELECTRICALLY OPERATED CRANE, HOIST, AND THE LIKE

Filed May 4, 1921         2 Sheets-Sheet 1

INVENTORS
WILLIAM H. SCOTT
JOHN BENTLEY
ATTORNEYS

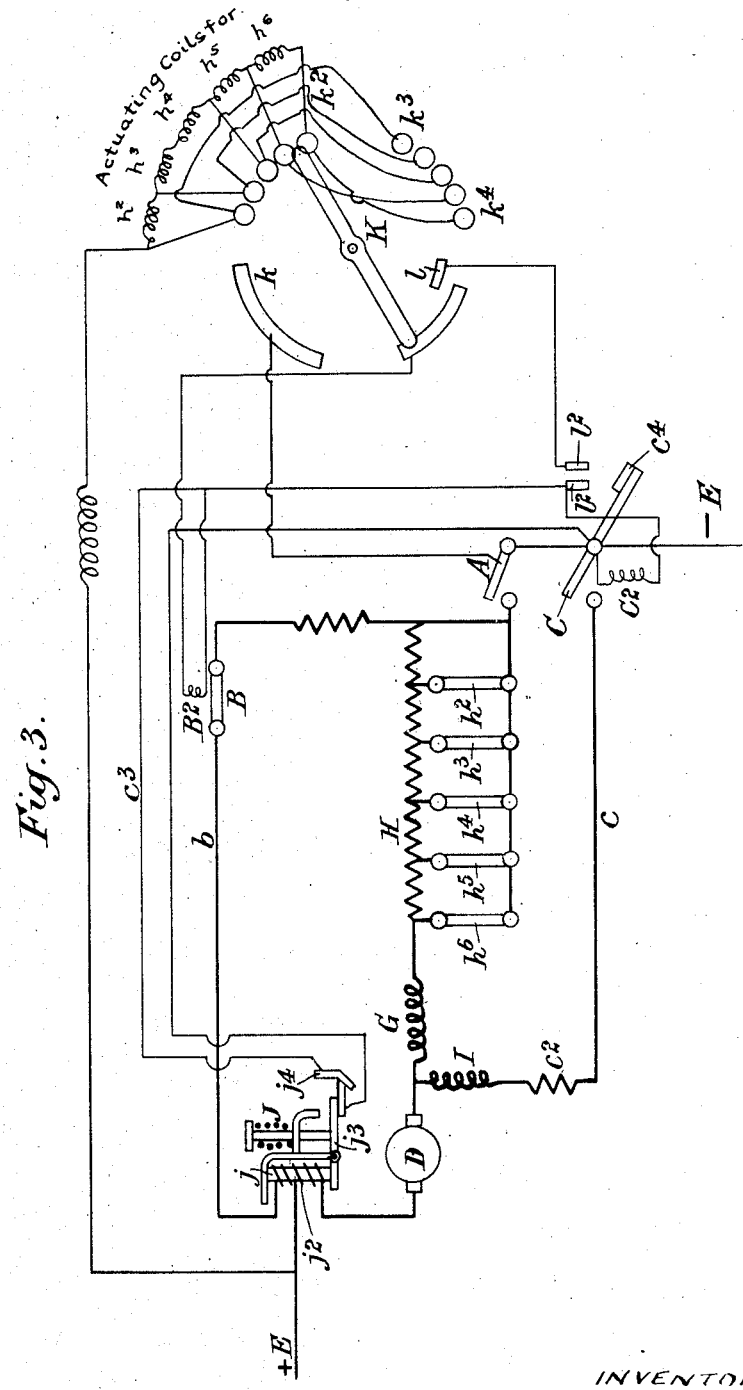

Patented June 2, 1925.

1,540,655

UNITED STATES PATENT OFFICE.

WILLIAM HARDING SCOTT AND JOHN BENTLEY, OF NORWICH, ENGLAND, ASSIGNORS TO LAURENCE SCOTT COMPANY LIMITED, OF NORWICH, ENGLAND.

ELECTRICALLY-OPERATED CRANE, HOIST, AND THE LIKE.

Application filed May 4, 1921. Serial No. 466,636.

*To all whom it may concern:*

Be it known that we, WILLIAM HARDING SCOTT and JOHN BENTLEY, both subjects of the King of Great Britain, residing at Gothic Works, Norwich, in the county of Norfolk, England, and 13 Beatrice Road, Norwich, in the county of Norfolk, England, respectively, have invented new and useful Improvements in or Connected with Electrically-Operated Cranes, Hoists, and the like, of which the following is a specification.

Our invention relates to electrically operated cranes, hoists, and the like, of the type in which the braking is effected rheostatically, that is in which the connections with the motor are such that, in lowering, it acts as a dynamo short-circuited across itself through more, or less, resistance according to the lowering speed required, and gives control of the speed when the load is ample and sufficient to overcome the friction of the gearing and drive the motor as a generator, but when the load is not sufficient to overcome the friction it is necessary to connect the mains, or source of electric power to start lowering, and this arrangement is liable, under certain conditions, to cause injury by the passage of excessive current, for instance, when the rheostatic braking circuit is closed when the motor has been allowed to attain a high speed on the power circuit.

The principal object of our invention is to provide means by which this objection is obviated.

In the arrangement according to our invention the series winding and the armature are connected up with the starting resistance so that, when the armature of the motor is turned by the load, the motor generates current through itself as in the aforesaid arrangement, but we provide means whereby, when this closed circuit is made, the main, or source of electric power, is connected with the armature of the motor through a separate, or auxiliary, resistance which allows a predetermined maximum current to flow. This current is divided between the armature and the series winding and will start the motor, under all conditions; for instance, in a crane it will start the lowering of a hook whose weight may not be sufficient to overcome the friction of the gear, and, when heavier loads are to be lowered, it will assist starting until the speed has increased to such an extent as to generate current in the closed circuit, the speed being under control by varying the resistance in the closed circuit. In this arrangement, the line voltage (that is the power circuit) is always on during the lowering, and therefore the voltage generated can never increase much above the line voltage and the speed on the power circuit cannot become excessive and consequently the danger of break-down from excess current is obviated.

We also include separate, or auxiliary, series-winding on the motor, in series with the aforesaid separate, or auxiliary, resistance and make the connections so as to excite the magnets for the lowering direction of rotation, the said series-winding increasing the torque with any given current from the main, or source of electric power.

According to a modification the circuit which carries the rheostatic braking current is put under the control of a load-discriminator, or an apparatus like, or equivalent to, a load-discriminator, which is inserted in the said circuit and disconnects the supply of current from the main, or current-supply circuit, when such current is not required, for example when lowering a heavy load. The said load-discriminator, or equivalent device, is preferably constructed and arranged as described in the specification of United States Letters Patent No. 1,399,664, December 6, 1920, granted to us and we will presume that that load-discriminator is employed; the main operating coil of the said load-discriminator having however a tapping from, or connection with, the main, whilst the whole of the coil is in the rheostatic braking circuit into which, when closed, the motor (then working as a generator) supplies current when the load is sufficient to drive the motor as a dynamo, the load-discriminator operating by its contacts, the contactor, or switch, which controls the current from the main.

We will describe, with reference to the accompanying drawings, means by which this invention can be performed.

Fig. 3 is a diagram illustrating the modification wherein a load-discriminator is employed the coil thereof having a mid-connection with the main.

The parts which correspond with each other in the several figures are marked with the same letters of reference.

Figure 1:
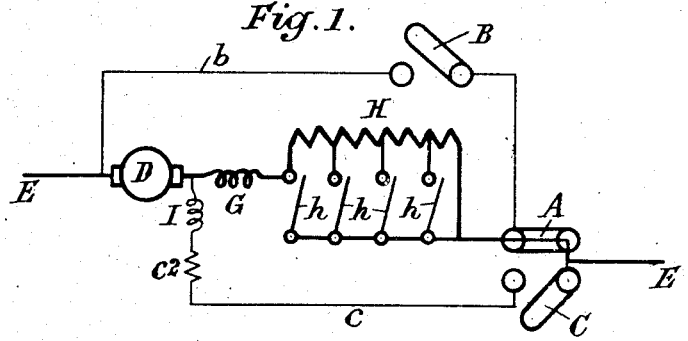
Figure 1 shows, diagrammatically, the connections made for hoisting
Figure 2:
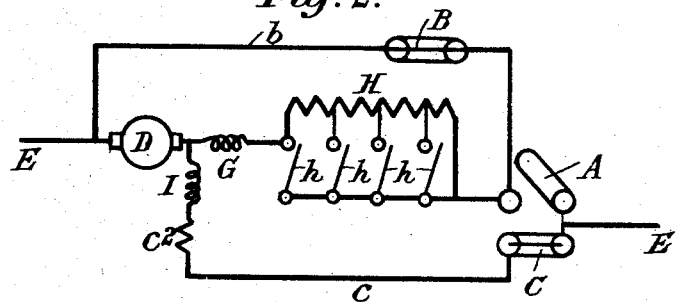
Figure 2 shows, diagrammatically, the connections made for lowering.

In Figures 1 and 2 the conductors through which the current is supposed to be passing, are indicated in thick lines, whilst the conductors through which the current is supposed not to be passing are indicated in thin lines.

Referring first to Figures 1 and 2, respectively shewing the switches in position for hoisting, and for lowering, the connections controlled by the switch A are, or may be, the ordinary, or any suitable, connections for a series-wound motor, the additional connections at $b$ and $c$, respectively controlled by the switches B and C, being provided in accordance with our invention, the said switches B and C, being closed, as shewn in Figure 2, for lowering the load, the switch A, being then open. Current from the main then passes through the switch C, conductor $c$, and auxiliary resistance $c^2$, and then divides, part of it going through the armature D, direct to the main E, and the other part going through the ordinary series-winding G, (and any of the starting resistance H which may not be short-circuited) to the main E, through the switch B, and rheostatic braking shunt $b$. The current in the series-winding G now passes in a direction for producing, in the armature D, the lowering direction of motion (that is motion in a direction the reverse of that in which it passes when the switches A, B, and C, are in the positions shewn in Figure 1) the speed being controlled by varying the starting resistance H, through the switches $h$, which, as they are closed, successively short-circuit portions of such resistance. On starting the lowering motion the current will divide itself between the armature D, and the series-winding, with the resistance H, (or such portion of it as may be left in the circuit) forming a shunt-winding of more, or less, resistance, which, in the event of the armature D being generating, absorbs the electricity generated in the said armature and puts a rheostatic brake thereon, the current in the main series-winding being then in the right direction for generating and the speed being controlled by the amount of the resistance H, which is included in the circuit.

The aforesaid separate, or auxiliary, series-winding, marked I, increases the magnetic flux, and consequently the starting power, thus enabling the motor to start running with a small current from the main when the switch C is closed.

Figure 4:
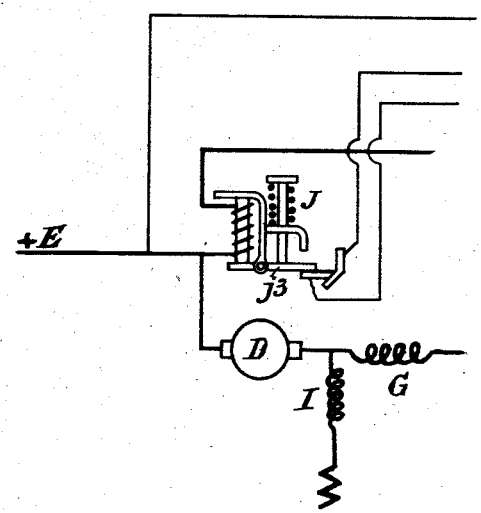
Figure 4 shews a modification in which the connection of the load-discriminator coil with the main is made at the end of the said coil.

Referring to Figures 3 and 4: As in the preceding Figures; A is the switch which controls the connections for the motor for the lifting direction; D is the armature of the said motor and G represents its series-winding. As in the hereinbefore described constructions the contactors, or switches, B and C, control additional connections, or circuits, at $b$ and $c$; $c^2$ being the resistance in the connection, or circuit, $c$. The main circuit is marked $+E$ and $-E$, the starting resistance H, its switches $h^2$ to $h^6$, and the separate, or auxiliary, series-winding I. In accordance with this modification, the load discriminator J is in the rheostatic braking circuit, $b$. Its operating coil, $j$, as shewn in Figure 3, has, at, or towards, its middle, a tapping from, or connection with, the main, at $+E$ whilst the whole of the coil $j$, is in the closed rheostatic braking circuit $b$ into which the motor, acting as a generator, supplies current when the load is sufficient to drive the motor as a dynamo, and the armature $j^3$ of the load-discriminator makes the contacts at $j^4$ and through the circuit $c^3$ short circuits the operating coil $C^2$ of the switch C, by which the power supply from the main is connected for lowering and this opens the said switch.

The effect of this arrangement is that when, in lowering, there is sufficient weight on the crane, or analogous apparatus, to cause the said generating effect, the load-discriminator J (as the generated current passes through the whole of the coil $j$ in one direction) short circuits the switch-operating coil $C^2$, and the switch C, is opened and the main circuit $+E$, $-E$, is cut off, but when the load which is being lowered is not sufficient to drive the motor as a generator, there is not sufficient current in the coil $j$ of the load-discriminator J, to make it operative and the power supply from the main is not cut off at C, and the armature D, can be driven thereby in the lowering direction, current from the main, owing to the mid-connection with the coil as shewn in the arrangement Figure 3, dividing itself between the motor winding G, and the rheostatic braking circuit $b$, and consequently going in opposite directions in the portions of the coil $j$ on either side of the mid-connection at $j^2$, and so cancelling, or partly cancelling, the effect of the said current in the load-discriminator coil $j$. If desired however the connection of the main to the coil $j$ may be at the armature end of the said coil $j$, as shewn in Figure 4, when the adjustment of the load-discriminator is such that it will not operate unless the current from the main be supplemented by generated current from the motor.

An operating contact, or operating contacts, $c^4$, is, or are, arranged on the switch C, which contact, or contacts, when the switch C, is closed, on account of the load being insufficient to drive the motor as a generator, will make contact at $l^2$, and enable the operator, through any suitable controlling device; for example, by moving the arm of the master controller K, so that it comes onto the contact at $l$, to disconnect the rheostatic braking circuit $b$ by short-circuiting the coil $B^2$, which controls the switch B, so that the motor can, when desired, be driven at a high speed for lowering, by current from the main.

In working the crane, hoist, or the like, in accordance with this modification it will be understood that the contacts of the master controller from $k$ to $k^2$, (in connection with which are indicated the usual switch-operating coils of the resistance H) are those used in lowering; the contacts from $k^3$, to $k^4$ being those used in hoisting. The operation in hoisting is, or may be, the same as usual, the switch, A, being closed and the other switches being worked in the usual way and the motor running as a simple series-wound machine. In lowering however, (presuming, for example that a heavy load is to be lowered), with the master controller arm, as shown in the diagram, on the contact for the first step of lowering, the switch contactor-coils $B^2$ and $C^2$, will, at first, both be operative, the coil $C^2$, closing the switch C which puts in current from the main to start the lowering and the coil $B^2$, closing the switch B, which completes the rheostatic braking circuit $b$ through the coil $j$, of the load discriminator J. The switch, C, is however shewn open in the diagram because, when lowering a heavy load, after the first start down, sufficient current passes through the switch, B, and to the coil $j$, to operate the load discriminator J, and by short-circuiting the coil $C^2$ causes the switch C, to open as shewn so that current from the main is cut off and the lowering speed is controlled through the rheostatic braking circuit, but should, in any case, the load be insufficient for generating current from the motor to open the switch C, and lower, at the requisite speed, the said switch, C, will close and the operator can, as hereinbefore explained, manipulate the master controller to obtain current from the main for lowering at the required speed.

In the aforesaid arrangements of connections, according to the several modifications illustrated, no reversing switch, such as is usually employed, is necessary, as the reversing is effected by opening the switch A, and closing the switches B and C.

What we claim is:—

1. In electrically operated hoisting apparatus, of the type described, a series-wound motor, a starting resistance, connections whereby the motor acts as a generator when the armature is driven by the load, an auxiliary resistance and in series therewith an auxiliary field winding for the motor, means operative, when the motor acts as a generator, for leading current from the source of power through the series field winding and the armature in parallel, and thence in series through the auxiliary field winding and the auxiliary resistance, the electrical connection being such that the motor magnets are excited for the lowering direction when the motor is rotated in the lowering direction, the said auxiliary winding serving to increase the torque when current is supplied through the auxiliary resistance and auxiliary winding from the source of electric power.

2. The combination with the construction specified in claim 1, of a rheostatic braking circuit, and independent switches controlling respectively the motor circuit, the auxiliary resistance and the rheostatic braking circuit, whereby on opening the motor circuit switch and closing the other switches, the motor may be reversed.

3. The combination with the construction specified in claim 1, of a rheostatic braking circuit, a load-discriminator arranged therein, and means associated therewith automatically controlling the supply of electric current to the auxiliary winding of the motor in accordance with the demand of the load.

4. The combination with the construction specified in claim 1, of a master controller, a rheostatic braking circuit, a load discriminator, a switch operated by the latter, and associated connections by which, under predetermined conditions, the rheostatic braking circuit may be disconnected by operation of the master controller to obtain a high lowering speed by direct connection of the motor to the source of power.

In testimony whereof we have signed our names to this specification in the presence of two subscribing witnesses.

WILLIAM HARDING SCOTT.
JOHN BENTLEY.

Witnesses:
  P. A. THONLESS,
  RICHARD HOLMES.